US012801054B2

(12) United States Patent
Terasaki et al.

(10) Patent No.: US 12,801,054 B2
(45) Date of Patent: Nov. 17, 2026

(54) TWO-COMPONENT DEVELOPER

(71) Applicant: KYOCERA Document Solutions Inc., Osaka (JP)

(72) Inventors: Kohei Terasaki, Osaka (JP); Tamotsu Shimizu, Osaka (JP); Yusuke Kurano, Osaka (JP); Masashi Yamashita, Osaka (JP); Yuma Uchihashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 493 days.

(21) Appl. No.: 18/576,301

(22) PCT Filed: Mar. 31, 2022

(86) PCT No.: PCT/JP2022/016378

§ 371 (c)(1),
(2) Date: Jan. 3, 2024

(87) PCT Pub. No.: WO2023/281880

PCT Pub. Date: Jan. 12, 2023

(65) Prior Publication Data

US 2024/0184227 A1 Jun. 6, 2024

(30) Foreign Application Priority Data

Jul. 9, 2021 (JP) ................................. 2021-114541

(51) Int. Cl.
*G03G 9/113* (2006.01)
*G03G 9/08* (2006.01)
*G03G 9/097* (2006.01)

(52) U.S. Cl.
CPC ......... *G03G 9/1139* (2013.01); *G03G 9/0819* (2013.01); *G03G 9/09708* (2013.01); *G03G 9/1135* (2013.01)

(58) Field of Classification Search
CPC ............... G03G 9/1139; G03G 9/0819; G03G 9/09708; G03G 9/1135
See application file for complete search history.

(56) References Cited

U.S. PATENT DOCUMENTS 11,092,907 B2 8/2021 Mizobe et al.
2007/0298339 A1* 12/2007 Kozuru ................ G03G 9/1138 430/111.1
2020/0341399 A1 10/2020 Mizobe et al.

FOREIGN PATENT DOCUMENTS

JP H065393 B2 * 1/1994 ........... G03G 9/1139
JP 2003280284 A * 10/2003

(Continued)

OTHER PUBLICATIONS

English machine translation of the description of JP-2007033631-A (Year: 2007).*

(Continued)

*Primary Examiner* — Boone Alexander Evans
(74) *Attorney, Agent, or Firm* — Studebaker Brackett PLLC

(57) ABSTRACT

In a two-component developer, toner particles include toner mother particles and external additive particles including strontium titanate particles. A first percentage content being a percentage content of the strontium titanate particles to the mass of the toner mother particles is 0.30-0.90% by mass. The carrier particles include carrier cores and coat layers. The coat layers contain barium titanate particles and a coating resin including a silicone resin. The barium titanate particles have a number average primary particle diameter of 100-500 nm. A second percentage content being a percentage content of the coat layers to the mass of the carrier cores is 2.0-4.0% by mass. A third percentage content being a percentage content of the barium titanate to the mass of the coating resin satisfies formula (1) "$(X \times 10) \leq Z \leq 45.0$". In (Continued)

formula (1), X represents the first percentage content and Z represents the third percentage content.

5 Claims, 1 Drawing Sheet

(56) References Cited

FOREIGN PATENT DOCUMENTS

JP 2007033631 A * 2/2007
JP 2020-181051 A 11/2020

OTHER PUBLICATIONS

English machine translation of the description of JP-H065393-B2 (Year: 1994).*
English machine translation of the description of JP-2003280284-A (Year: 2003).*

* cited by examiner

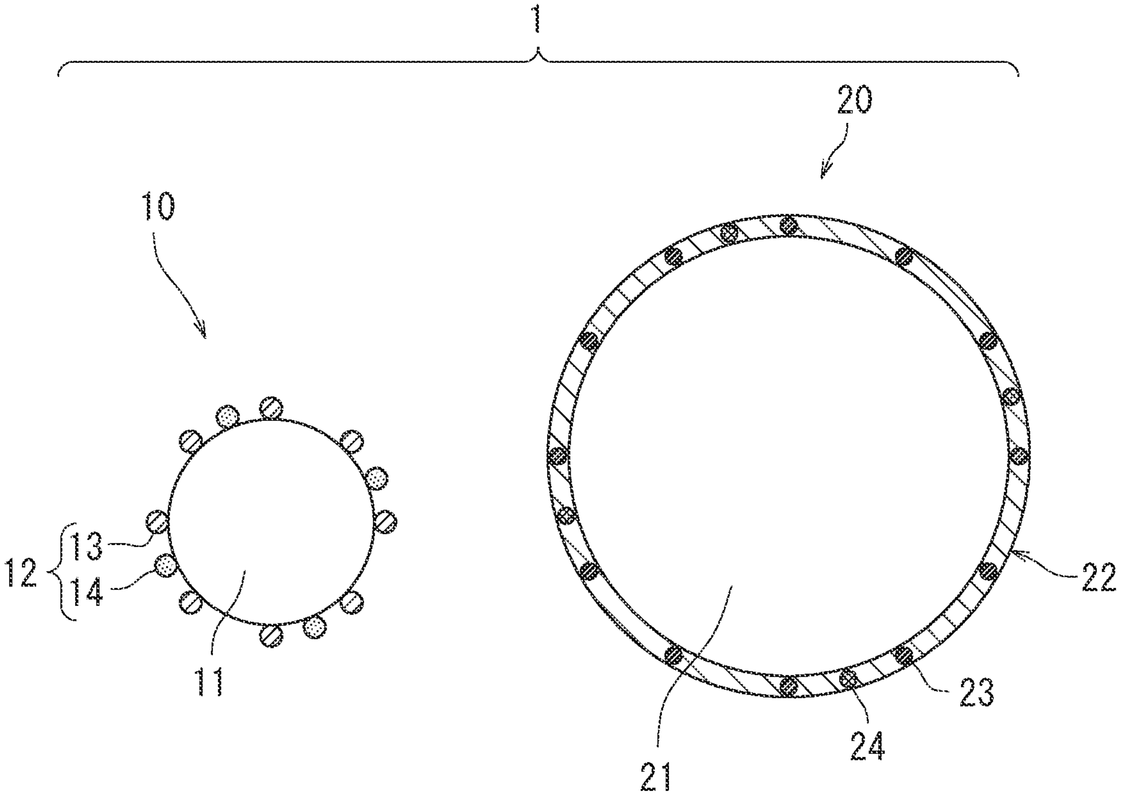
1
10
20
12
13
14
11
21
22
23
24

TWO-COMPONENT DEVELOPER

TECHNICAL FIELD

The present invention relates to a two-component developer.

BACKGROUND ART

Image forming apparatus for forming images with toner are required to stably charge the toner to a charge amount within a desired range. Titanic acid compounds, which have relatively high specific permittivity, tend to be able to maintain the charge amount of the toner within the desired range even after multiple printing. As such, toners containing titanic acid compound particles as external additive particles are studied. For example, the toner disclosed in Patent Literature 1 contains toner particles including, as the external additive particles, titanic acid compound particles to which lanthanum and a Group 5 element of the periodic table are doped.

CITATION LIST

Patent Literature

Patent Literature 1
Japanese Patent Application Laid-Open Publication No. 2020-181051

SUMMARY OF INVENTION

Technical Problem

However, there is room for the toner disclosed in Patent Literature 1 in terms of improvement in image formation with less fog and reduction in fluctuations in the charge amount of the toner when the toner concentration in a two-component developer changes.

The present invention has been made in view of the foregoing and has its object of providing a two-component developer that can contribute to formation of images with less fog and that can reduce fluctuations in the charge amount of toner even when the toner concentration changes.

Solution to Problem

A two-component developer according to the present invention contains a toner containing toner particles and a carrier containing carrier particles. The toner particles each include a toner mother particle and external additive particles provided on a surface of the toner mother particle. The external additive particles include strontium titanate particles. A first percentage content is at least 0.30% by mass and no greater than 0.90% by mass. The first percentage content is a percentage content of the strontium titanate particles to a mass of the toner mother particles. The carrier particles each include a carrier core and a coat layer covering a surface of the carrier core. The coat layers contain a coating resin and barium titanate particles. The coating resin includes a silicone resin. The barium titanate particles have a number average primary particle diameter of at least 100 nm and no greater than 500 nm. A second percentage content is at least 2.0% by mass and no greater than 4.0% by mass. The second percentage content is a percentage content of the coat layers to a mass of the carrier cores. A third percentage content satisfies a formula (1). The third percentage content is a percentage content of the barium titanate to a mass of the coating resin. In the formula (1), X represents the first percentage content and Z represents the third percentage content.

$$(X \times 10) \leq Z \leq 45.0 \qquad (1)$$

Advantageous Effects of Invention

With use of the two-component developer of the present invention, images with less fog can be formed and fluctuations in the charge amount of the toner can be reduced even when the toner concentration changes.

BRIEF DESCRIPTION OF DRAWINGS

FIGURE is a diagram illustrating a two-component developer according to an embodiment of the present invention.

DESCRIPTION OF EMBODIMENTS

The meanings of the terms used in the present description and measurement methods are described first. A toner is a collection (e.g., a powder) of toner particles. An external additive is a collection (e.g., a powder) of external additive particles. A carrier is a collection (e.g., a powder) of carrier particles. Unless otherwise stated, evaluation results (values indicating shape or physical properties) for a powder (specific examples include a powder of toner particles, a powder of external additive particles, and a powder of carrier particles) are number averages of values measured for a suitable number of particles selected from the powder. The "main component" of a material means a component most abundant in the material in terms of mass unless otherwise stated. > The level of hydrophobicity (or hydrophilicity) can be expressed by a contact angle of a water droplet (ease of getting wet with water), for example. A lager contact angle of a water droplet indicates a higher level of hydrophobicity. In the following description, the term "-based" may be appended to the name of a chemical compound to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. One type of each component described in the present description may be used independently, or two or more types of the component may be used in combination.

A measurement value for volume median diameter ($D_{50}$) of a powder is a median diameter of the powder as measured using a laser diffraction/scattering type particle size distribution analyzer ("LA-950", product of HORIBA, Ltd.) unless otherwise stated. Unless otherwise stated, the number average particle diameter of a powder is a number average value of equivalent circle diameters (Heywood diameters: diameters of circles having the same areas as projected areas of the primary particles) of primary particles of the powder as measured using a scanning electron microscope. The number average primary particle diameter of a powder is a number average value of equivalent circle diameters of 100 primary particles of the powder, for example. Values for softening point (Tm) are values as measured using a capillary rheometer ("CFT-500D", product of Shimadzu Corporation) unless otherwise stated. On an S-shaped curve (vertical axis: temperature, horizontal axis: stroke) as plotted using the capillary rheometer, the softening point corresponds to the temperature corresponding to a stroke value of "(base line stroke value+maximum stroke value)/2". Measurement values for melting point (Mp) each are a temperature at a maximum endothermic peak on an endothermic curve (vertical axis: heat flow (DSC signal), horizontal axis: temperature) as plotted using a differential scanning calorimeter ("DSC-6220", product of Seiko Instruments Inc.) unless otherwise state. The endothermic peak appears due to melting of the crystallization site. Values for glass transition point (Tg) are values as measured in accordance with the "Japanese Industrial Standards (JIS) K7121-2012" using a differential scanning calorimeter ("DSC-6220", product of Seiko Instruments Inc.) unless otherwise stated. The glass transition point corresponds to the temperature corresponding to a point of inflection (specifically, an intersection point of an extrapolated baseline and an extrapolated falling line) caused by glass transition on a heat absorption curve (vertical axis: heat flow (DSC signal), horizontal axis: temperature) as plotted using the differential scanning calorimeter. Measurement values for acid value and hydroxyl value are values as measured in accordance with the "Japanese Industrial Standards (JIS) K0070-1992" unless otherwise stated. Measurement values for mass average molecular weight (Mw) are values as measured by gel permeation chromatography unless otherwise stated. Unless otherwise stated, the level of chargeability is the ease of triboelectric charging to a standard carrier provided by The Imaging Society of Japan. For example, a measurement target is stirred together with a standard carrier (anionicity: N-01, cationicity: P-01) provided by The Imaging Society of Japan to triboelectrically charge the measurement target. The surface potential of the measurement target is measured before and after triboelectric charging using for example a Q/m meter ("MODEL 212HS", product of TREK, INC.). A larger change in potential between before and after triboelectric charging indicates a higher chargeability of the measurement target. The meanings of the terms used in the present description and the measurement methods have been described so far.

[Two-Component Developer]

The following describes a two-component developer (also referred to below as a developer) 1 according to an embodiment of the present invention with reference to FIGURE. FIGURE illustrates the developer 1 according to the present embodiment. Note that the same hatching is provided for a plurality of identical elements and one of these identical elements is labeled with a reference sign while the other identical elements are indicated with the reference sign omitted.

The developer 1 contains a toner and a carrier. The toner contains toner particles 10. The carrier contains carrier particles 20. The toner particles 10 each include a toner mother particle 11 and external additive particles 12. The external additive particles 12 are provided on the surface of the toner mother particle 11. The external additive particles 12 include strontium titanate particles 13. A first percentage content being a percentage content of the strontium titanate particles 13 to the mass of the toner mother particles 11 is at least 0.30% by mass and no greater than 0.90% by mass. The carrier particles 20 each include a carrier core 21 and a coat layer 22. The coat layer 22 covers the surface of the carrier core 21. The coat layers 22 contain a coating resin and barium titanate particles 23. The coating resin includes a silicone resin. The barium titanate particles 23 have a number average primary particle diameter of at least 100 nm and no greater than 500 nm. A second percentage content being a percentage content of the coat layers 22 to the mass of the carrier cores 21 is at least 2.0% by mass and no greater than 4.0% by mass. A third percentage content being a percentage content of the barium titanate particles 23 to the mass of the coating resin satisfies formula (1). In formula (1), X represents the first percentage content and Z represents the third percentage content.

$$(X \times 10) \leq Z \leq 45.0 \quad (1)$$

In the following, the "first percentage content being a percentage content of the strontium titanate particles 13 to the mass of the toner mother particles 11" may be also referred to as a "ST/mother particle rate". Also, the "second percentage content being a percentage content of the coat layers 22 to the mass of the carrier cores 21" may be also referred to below as a "coat layer/core rate". In addition, the "third percentage content being a percentage content of the barium titanate particles 23 to the mass of the coating resin may be also referred to below as "BT/coating resin rate". Note that each of the first percentage content, the second percentage content, and the third percentage content is a percentage (unit: % by mass).

As a result of the developer 1 according to the present embodiment having the above features, images with less fog can be formed and fluctuations in the charge amount of the toner can be reduced even when the toner concentration in the developer 1 changes. Presumably, the reasons therefor are as follows.

The toner particles 10 in the developer 1 according to the present embodiment include strontium titanate particles 13 as the external additive particles 12. The toner particles 10 including the strontium titanate particles 13 have a relatively large capacitance because the strontium titanate particles 13 have a relatively high specific permittivity. The larger the capacitance of the toner particles 10 is, the larger the triboelectric charge amount thereof is. As such, the toner particles 10 are easily charged to a charge amount within a desired range. As a result, a portion of the toner particles 10 whose charge amount is less than a desired value and another portion of the toner particles 10 that are oppositely charged decrease, thereby achieving formation of images with less fog.

However, the larger the capacitance of the toner particles 10 is, the more charge the toner particles 10 can accept. Therefore, when the ability (hereinafter also referred to below as charge imparting ability) of the carrier particles 20 to charge the toner particles 10 by friction is low, it is difficult to supply charge from the carrier particles 20 to the toner particles 10 in an amount commensurate with the amount of charge accepted. Thus, the charge amount of the toner severely fluctuates when the toner concentration changes in a developer.

In view of the foregoing, the coat layers 22 of the carrier particles 20 contain the barium titanate particles 23 in the developer 1 according to the present embodiment. The barium titanate particles 23 have a relatively high specific permittivity, and accordingly, the carrier particles 20 containing the barium titanate particles 23 in the coat layers 22 thereof have a relatively high capacitance. The larger the capacitance of the carrier particles 20 is, the larger the amount of triboelectric charge (triboelectric charge with opposite polarity to that of the toner particles 10) is. The level of the charge imparting ability of the carrier particles 20 is high accordingly. As a result, charge in an amount commensurate with the amount of charge accepted by the toner particles 10 is supplied from the carrier particles 20 to the toner particles 10. Thus, fluctuations in the charge amount of the toner can be reduced even when the toner concentration in the developer 1 changes.

The toner particles 10 in the developer 1 according to the present embodiment have a ST/mother particle rate of at least 0.30% by mass and no greater than 0.90% by mass. As a result of the ST/mother particle rate being set to at least 0.30% by mass, the capacitance of the toner particles 10 and ultimately the triboelectric charge are sufficiently large. As such, the toner particles 10 can be charged to a charge amount within the desired range, thereby achieving formation of images with less fog. As a result of the ST/mother particle rate being set to no greater than 0.90 by mass by contrast, the strontium titanate particles 13 hardly detach from the toner mother particles 11. Accordingly, a phenomenon in which the detached strontium titanate particles 13 inhibit contact between the toner particles 10 and the carrier particles 20 will hardly occur. As a result, the toner particles 10 can be charged to a charge amount within the desired range by friction, thereby achieving formation of images with less fog.

The barium titanate particles 23 in the developer 1 according to the present embodiment have a number average primary particle diameter of at least 100 nm and no greater than 500 nm. When the number average primary particle diameter of the barium titanate particles 23 is less than 100 nm, the specific permittivity thereof tends to be low. As a result of the number average primary particle diameter of the barium titanate particles 23 being set to at least 100 nm, the specific permittivity of the barium titanate particles 23 is sufficiently high to increase the capacitance of the carrier particles 20. Thus, fluctuations in the charge amount of the toner can be reduced even when the toner concentration in the developer 1 changes. As a result of the number average primary particle diameter of the barium titanate particles 23 being set to no greater than 500 nm, the barium titanate particles 23 will sink into the coat layers 22 and hardly detach from the coat layers 22. Accordingly, a phenomenon in which the detached barium titanate particles 23 inhibit contact between the toner particles 10 and the carrier particles 20 will hardly occur. As such, the toner particles 10 can be charged to a charge amount within the desired range, thereby achieving formation of images with less fog.

The carrier particles 20 in the developer 1 according to the present embodiment have a coat layer/core rate of at least 2.0% by mass and no greater than 4.0% by mass. As a result of the coat layer/core rate being set to at least 2.0% by mass, the carrier cores 21 are sufficiently covered with the coat layers 22. Accordingly, friction between the toner particles 10 and the coat layers 22 of the carrier particles 20 can charge the toner particles 10 to a charge amount within the desired range, thereby achieving formation of images with less fog. When the coat layer/core rate exceeds 4.0% by mass by contrast, the coat layers 22 are thick and the capacitance of the carrier particles 20 tends to be low. As a result of the coat layer/core rate being set to no greater than 4.0% by mass, the capacitance of the carrier particles 20 increases and fluctuations in the charge amount of the toner can be reduced even when the toner concentration in the developer 1 changes. Furthermore, as a result of the coat layer/core rate being set to no greater than 4.0% by mass, agglomeration of the carrier particles 20 can be inhibited in formation of the coat layers 22 in a later-described carrier formation process. Non-agglomerated or less agglomerated carrier particles 20 can cause favorable triboelectric charging with a result that the toner particles 10 can be charged to a charge amount within the desired range, thereby achieving formation of images with less fog.

The BT/coating resin rate of the carrier particles 20 in the developer 1 according to the present embodiment satisfies formula (1) "$(X\times10)\leq Z\leq45.0$". That is, Z (unit: % by mass) is at least X×10% by mass and no greater than 45.0% by mass. When Z (i.e., the BT/coating resin rate of the carrier particles 20) in formula (1) is at least X×10 (i.e., a value obtained by multiplying the ST/mother particle rate of the toner particles 10 by 10), the capacitance of the carrier particles 20 is sufficiently large relative to the capacitance of the toner particles 10. As a result, charge in an amount commensurate with the amount of charge accepted by the toner particles 10 is supplied from the carrier particles 20 to the toner particles 10. Thus, fluctuations in the charge amount of the toner can be reduced even when the toner concentration in the developer 1 changes. When Z (i.e., the BT/coating resin rate of the carrier particles 20) in formula (1) exceeds 45.0, the amount of the barium titanate particles 23 is excessive and a part of the barium titanate particles 23 is liable not to sink in the coat layers 22 and liable to detach from the coat layers 22. As a result of Z being set to no greater than 45.0, the barium titanate particles 23 sink into the coat layers 22 and hardly detach from the coat layers 22. As such, a phenomenon in which the barium titanate particles 23 detached from the coat layers 22 inhibit contact between the toner particles 10 and the carrier particles 20 will hardly occur and the toner particles 10 can be charged by friction to a charge amount within the desired range. Thus, images with less fog can be formed.

The reasons have been described so far why the developer 1 according to the present embodiment can contribute to formation of images with less fog and reduce fluctuations in the charge amount of the toner even when the toner concentration in the developer 1 changes.

Note that when the ST/mother particle rate is no greater than 0.90 mass, the strontium titanate particles 13 hardly detach from the toner mother particles 11 as described previously. Furthermore, when Z in formula (1) is no greater than 45.0, the barium titanate particles 23 sink into the coat layers 22 and hardly detach from the coat layers 22 as described previously. From the above, a phenomenon in which the strontium titanate particles 13 or the barium titanate particles 23 in the developer 1 according to the present embodiment are detached and transported to a gap between a cleaning blade and a photosensitive drum can be inhibited. As a result, burden on the cleaning blade can be reduced. The toner and the carrier contained in the developer 1 are further described next in detail.

[Toner]

The toner contains toner particles 10. The toner particles 10 each include a toner mother particle 11 and external additive particles 12. The external additive particles 12 are provided on the surface of the toner mother particle 11. The external additive particles 12 and the toner mother particles 11 are described below.

<External Additive Particles>

The external additive particles 12 include strontium titanate particles 13. The external additive particles 12 may further include external additive particles (also referred to below as optional external additive particles) 14 other than the strontium titanate particles 13 as necessary. However, the optional external additive particles 14 can be dispensed with. The strontium titanate particles 13 and the optional external additive particles 14 are described below.

(Strontium Titanate Particles)

As described previously, the ST/mother particle rate is at least 0.30% by mass and no greater than 0.90% by mass. In order to form images with less fog, the ST/mother particle rate is preferably at least 0.35 and no greater than 0.80, and more preferably at least 0.40 and no greater than 0.70.

In order to form images with less fog and reduce fluctuations in the charge amount of the toner when the toner concentration in the developer 1 changes, the strontium titanate particles 13 have a number average primary particle diameter of preferably at least 20 nm and no greater than 80 nm, more preferably at least 30 nm and no greater than 80 nm, further preferably at least 50 nm and no greater than 80 nm, and further more preferably at least 60 nm and no greater than 80 nm.

The strontium titanate particles 13 may be doped or undoped. The strontium titanate particles 13 may be undoped strontium titanate particles since the capacitance of the toner particles 10 can be increased sufficiently to such an extent that images with less fog can be formed. For example, the strontium titanate particles 13 may be strontium titanate particles doped with neither lanthanum nor Group 5 element (e.g., niobium or tantalum) of the periodic table.

(Optional External Additive Particles)

Examples of the optional external additive particles 14 include silica particles, alumina particles, magnesium oxide particles, and zinc oxide particles. The optional external additive particles 14 may be surface-treated. For example, when silica particles are used as the optional external additive particles 14, either or both hydrophobicity and positive chargeability may be imparted to the surfaces of the silica particles with a surface treatment agent. The optional external additive particles 14 have a number average primary particle diameter of preferably at least 1 nm and no greater than 60 nm, and more preferably at least 5 nm and no greater than 25 nm. The amount of the optional external additive particles 14 is preferably at least 0.1 parts by mass and no greater than 10.0 parts by mass relative to 100.0 parts by mass of the toner mother particles 11, and more preferably at least 1.0 parts by mass and no greater than 2.0 parts by mass.

<Toner Mother Particles>

The toner mother particles 11 contain at least one selected from the group consisting of a binder resin, a colorant, a charge control agent, and a releasing agent. The following describes the binder resin, the colorant, the charge control agent, and the releasing agent.

(Binder Resin)

In order that the toner has excellent low-temperature fixability, the toner mother particles 11 preferably contain a thermoplastic resin as the binder resin, and more preferably contain a thermoplastic resin at a rate of at least 85% by mass of the total of the binder resin. Examples of the thermoplastic resin include polyester resins, styrene-based resins, acrylic acid ester-based resins (specific examples include acrylic acid ester copolymers and methacrylic acid ester copolymers), olefin-based resins (specific examples include polyethylene resin and polypropylene resin), vinyl resins (specific examples include vinyl chloride resin, polyvinyl alcohol, vinyl ether resin, and N-vinyl resin), polyamide resins, and urethane resins. Any copolymer of these resins, that is, any copolymer (more specific examples include styrene-acrylic resin and styrene-butadiene-based resin) with any repeating unit introduced into any of the resins may be used as the binder resin.

The binder resin is preferably a polyester resin. The polyester resin is a polymer of at least one polyhydric alcohol monomer and at least one polybasic carboxylic acid monomer. Note that a polybasic carboxylic acid derivative (specific examples include an anhydride of polybasic carboxylic acid and a polybasic carboxylic acid halide) may be used instead of the polybasic carboxylic acid monomer.

Examples of the polyhydric alcohol monomer include diol monomers, bisphenol monomers, and tri- or higher-hydric alcohol monomers.

Examples of the diol monomers include ethylene glycol, diethylene glycol, triethylene glycol, 1,2-propanediol, 1,3-propanediol, 1,4-butanediol, neopentyl glycol, 2-butene-1,4-diol, 1,5-pentanediol, 1,6-hexanediol, 1,4-cyclohexanedimethanol, 1,4-benzenediol, dipropylene glycol, polyethylene glycol, polypropylene glycol, and polytetramethylene glycol.

Examples of the bisphenol monomers include bisphenol A, hydrogenated bisphenol A, bisphenol A ethylene oxide adducts, and bisphenol A propylene oxide adducts.

Examples of the tri- or higher hydric alcohol monomers include sorbitol, 1,2,3,6-hexanetetraol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of the polybasic carboxylic acid monomer include dibasic carboxylic acid monomers and tri- or higher-basic carboxylic acid monomers.

Examples of the dibasic carboxylic acid monomers include maleic acid, fumaric acid, citraconic acid, itaconic acid, glutaconic acid, phthalic acid, isophthalic acid, terephthalic acid, 5-sulfoisophthalic acid, sodium 5-sulfoisophthalic acid, cyclohexanedicarboxylic acid, adipic acid, sebacic acid, azelaic acid, malonic acid, succinic acid, alkyl succinic acids, and alkenyl succinic acids. Examples of the alkyl succinic acids include n-butylsuccinic acid, isobutylsuccinic acid, n-octylsuccinic acid, n-dodecylsuccinic acid, and isododecylsuccinic acid. Examples of the alkenyl succinic acids include n-butenylsuccinic acid, isobutenylsuccinic acid, n-octenylsuccinic acid, n-dodecenylsuccinic acid, and isododecenylsuccinic acid.

Examples of the tri- or higher-basic carboxylic acid monomers include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid.

The polyester resin is preferably a polymer of a bisphenol monomer, a dibasic carboxylic acid monomer, and a tribasic carboxylic acid monomer. The polyester resin is further preferably a polymer of a bisphenol A alkylene oxide adduct, a dicarboxylic acid having a carbon number of at least 3 and no greater than 6, and an aryltricarboxylic acid. The polyester resin is further preferably a polymer of a bisphenol A ethylene oxide adduct, a bisphenol A propylene oxide adduct, fumaric acid, and trimellitic acid.

The polyester resin is preferably a non-crystalline polyester resin. For many non-crystalline polyester resins, it is often not possible to determine a clear melting point. As such, a polyester resin for which no clear endothermic peak cannot be determined on an endothermic curve measured using a differential scanning calorimeter can be determined to be a non-crystalline polyester resin.

The polyester resin has a softening point of preferably at least 50° C. and no greater than 200° ° C., and more preferably at least 80° C. and no greater than 120° C. The polyester resin preferably has a glass transition point of at least 40° C. and no greater than 100° C., and more preferably is at least 40° C. and no greater than 60° C.

The polyester resin has a mass average molecular weight of preferably at least 10,000 and no greater than 50,000, and more preferably at least 20,000 and no greater than 40,000.

The polyester resin has an acid value of preferably at least 1 mg KOH/g and no greater than 30 mg KOH/g, and more preferably at least 10 mg KOH/g and no greater than 20 mg KOH/g. The polyester resin has a hydroxyl value of preferably at least 1 mg KOH/g and no greater than 50 mg KOH/g, and more preferably at least 20 mg KOH/g and no greater than 40 mg KOH/g.

(Colorant)

The colorant can be a known pigment or dye that matches the color of the toner. Examples of the colorant include black colorants, yellow colorants, magenta colorants, and cyan colorants.

Carbon black can for example be used as a black colorant. Alternatively, a black colorant can be used that has been adjusted to a black color using a yellow colorant, a magenta colorant, and a cyan colorant.

Examples of a yellow colorant that can be used include at least one compound selected from the group consisting of a condensed azo compound, an isoindolinone compound, an anthraquinone compound, an azo metal complex, a methine compound, and an arylamide compound. Specific examples of the yellow colorant include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, and C. I. Vat Yellow.

Examples of a magenta colorant that can be used include at least one compound selected from the group consisting of a condensed azo compound, a diketopyrrolopyrrole compound, an anthraquinone compound, a quinacridone compound, a basic dye lake compound, a naphthol compound, a benzimidazolone compound, a thioindigo compound, and a perylene compound. Examples of the magenta colorant include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254).

Examples of a cyan colorants that can be used include at least one compound selected from the group consisting of a copper phthalocyanine compound, an anthraquinone compound, and a basic dye lake compound. Examples of the cyan colorant include C.I. Pigment Blue (1, 7, 15, 15:1, 15:2, 15:3, 15:4, 60, 62, or 66), Phthalocyanine Blue, C. I. Vat Blue, and C. I. Acid Blue.

The amount of the colorant is preferably at least 1 part by mass and no greater than 20 parts by mass relative to 100 parts by mass of the binder resin.

(Charge Control Agent)

The charge control agent is used for example for the purpose of improving charge stability and a charge rise characteristic of the toner. The charge rise characteristic of the toner is an indicator as to whether the toner can be charged to a specific charge level in a short period of time. Examples of the charge control agent include positive charge control agents and negative charge control agents. When a positive charge control agent is contained in the toner mother particles 11, cationic strength (positive chargeability) of the toner can be increased. When a negative charge control agent is contained in the toner mother particles 11, anionic strength (negative chargeability) of the toner can be increased. Examples of the positive charge control agents include pyridine, nigrosine, and quaternary ammonium salts. Examples of the negative charge control agents include metal-containing azo dyes, sulfo group-containing resins, oil-soluble dyes, naphthenic acid metal salts, acetylacetone metal complexes, salicylic acid-based metal complexes, boron compounds, fatty acid soaps, and long-chain alkyl carboxylates. However, the toner mother particle 11 does not need to contain a charge control agent where sufficient chargeability is ensured in the toner. The amount of the charge control agent is preferably at least 1 part by mass and no greater than 10 parts by mass relative to 100 parts by mass of the binder resin.

(Releasing Agent)

The releasing agent is used for the purpose of obtaining a toner excellent in hot offset resistance, for example. Examples of the releasing agent include aliphatic hydrocarbon-based waxes, oxides of aliphatic hydrocarbon-based waxes, plant waxes, animal waxes, mineral waxes, waxes having a fatty acid ester as a main component, and waxes in which a fatty acid ester has been partially or fully deoxidized. Examples of the aliphatic hydrocarbon waxes include polyethylene waxes (e.g., low molecular weight polyethylene), polypropylene waxes (e.g., low molecular weight polypropylene), polyolefin copolymers, polyolefin wax, microcrystalline wax, paraffin wax, and Fischer-Tropsch wax. Examples of the oxides of aliphatic hydrocarbon waxes include oxidized polyethylene waxes and block copolymers of oxidized polyethylene waxes. Examples of the plant waxes include candelilla wax, carnauba wax, Japan wax, jojoba wax, and rice wax. Examples of the animal waxes include bee wax, lanolin, and spermaceti. Examples of the mineral waxes include ozokerite, ceresin, and petrolatum. Examples of the waxes having a fatty acid ester as a main component include montanic acid ester wax and castor wax. Examples of the waxes in which a fatty acid ester has been partially or fully deoxidized include deoxidized carnauba wax. The amount of the releasing agent is preferably at least 1 part by mass and no greater than 20 parts by mass relative to 100 parts by mass of the binder resin.

Note that the toner particles 10 may contain a known additive as necessary. Preferably, the toner particles 10 have a volume median diameter of at least 4 μm and no greater than 12 μm. The toner mother particles 11 have a volume median diameter of preferably at least 4 μm and no greater than 12 μm, and more preferably at least 5 μm and no greater than 9 μm. The toner particles 10 may be a magnetic toner or a non-magnetic toner. When the toner particles 10 are a magnetic toner, the toner mother particles 11 further contain a magnetic powder. The amount of the toner in the developer 1 is preferably at least 1 part by mass and no greater than 15 parts by mass relative to 100 parts by mass of the carrier, and more preferably at least 3 parts by mass and no greater than 10 parts by mass. For ease of description, a non-capsule toner mother particle 11 is illustrated in FIGURE. However, capsule toner mother particles may be used each of which include the toner mother particle 11 illustrated in FIGURE as a toner core and a shell layer covering the toner core. The toner has been descried so far.

[Carrier]

The carrier contains carrier particles 20. The carrier particles 20 each include a carrier core 21 and a coat layer 22. The coat layer 22 is provided on the surface of the carrier core 21. The coat layer 22 covers the surface of the carrier core 21. The coat layer 22 may cover the entire surface of the carrier core 21 or may partially cover the surface of the carrier core 21.

As described previously, the coat layer/core rate is at least 2.0% by mass and no greater than 4.0% by mass. In order to form images with less fog, the coat layer/core rate is preferably at least 2.1% by mass, and more preferably at least 2.2 parts by mass. In order to reduce fluctuations in the charge amount of the toner when the toner concentration in the developer 1 changes, the coat layer/core rate is preferably no greater than 3.9% by mass, and more preferably no greater than 3.0% by mass. The carrier cores 21 and the coat layers 22 of the carrier particles 20 are described below.

<Carrier Cores>

The carrier cores 21 contain a magnetic material, for example. Examples of the magnetic material contained in the carrier cores 21 include metal oxides, and more specific examples include magnetite, maghemite, and ferrite. Ferrite has high fluidity and tends to be chemically stable. As such, the carrier cores 21 preferably contain ferrite in terms of formation of high-quality images over a long period of term. Examples of ferrite include barium ferrite, manganese ferrite (Mn-ferrite), Mn—Zn ferrite, Ni—Zn ferrite, Mn—Mg ferrite, Ca—Mg ferrite, Li ferrite, and Cu—Zn ferrite. The shape of the carrier cores 21 is not limited particularly and may be irregular or spherical. A commercially available product may be used as the carrier cores 21. Alternatively, the carrier cores 21 may be self-made by crushing and sintering the magnetic material.

The carrier cores 21 have a volume median diameter of preferably at least 20.0 μm and no greater than 60.0 μm, more preferably at least 20.0 μm and less than 40.0 μm, and particularly preferably at least 20.0 μm and no greater than 35.0 μm. As a result of the volume median diameter of the carrier cores 21 being set to at least 20.0 μm, a problem (carrier development) resulting from the carrier particles 20 attaching to a photosensitive drum will hardly occur. Thus, a phenomenon in which the carrier particles 20 attached to the photosensitive drum transfers from the photosensitive drum to a transfer section can be inhibited, thereby inhibiting occurrence of image defects such as void. Furthermore, occurrence of cleaning defects can be inhibited because carrier development hardly occurs. As a result of the volume median diameter of the carrier cores 21 being set to no greater than 60.0 μm by contrast, a fine magnetic brush of the developer 1 can be formed on the circumferential surface of a development roller in image formation, thereby achieving formation of high-quality images.

Preferably, the carrier cores 21 have a saturation magnetization of at least 65 emu/g and no greater than 90 emu/g. Where the carrier cores 21 contain Mn-ferrite, the higher the percentage content of Mn is, the lower the saturation magnetization of the carrier cores 21 tends to be. Also, where the carrier cores 21 contain Mn—Mg ferrite, the higher the percentage content of the Mg is, the lower the saturation magnetization of the carrier cores 21 tends to be.

<Coat Layers>

The coat layers 22 contain a coating resin and barium titanate particles 23. Preferably, the coat layers 22 further contain carbon black particles 24. However, the carbon black particles 24 can be dispensed with. The coating resin, the barium titanate particles 23, and the carbon black particles 24 are described below.

(Coating Resin)

In order to triboelectrically charge the toner in a favorable manner, the coating resin includes a silicone resin. Preferable examples of the silicone resin include an epoxy resin modified silicone resins and silicone resins having a methyl group. One example of the silicone resins having a methyl group is a silicone resin having a methyl group and not having a phenyl group. Another example of the silicone resin having a methyl group is a silicone resin (also referred to below as a "methylphenyl silicone resin") having a methyl group and a phenyl group. The coat layers 22 may contain only a silicone resin as the coating resin or may further contain a resin other than the silicone resin.

(Barium Titanate Particles)

As described previously, the barium titanate particles 23 have a number average primary particle diameter of at least 100 nm and no greater than 500 nm. In order to reduce fluctuations in the charge amount of the toner when the toner concentration in the developer 1 changes, the number average primary particle diameter of the barium titanate particles 23 is preferably at least 200 nm. In order to form images with less fog, the number average primary particle diameter of the barium titanate particles 23 is preferably no greater than 400 nm.

As described previously, the BT/coating resin rate satisfies formula (1) "$(X\times10)\leq Z\leq45.0$". Z in formula (1) represents the BT/coating resin rate. Where the coating resin includes two or more resins, the mass of the coating resin means the sum of the masses of the two or more resins. In order to reduce fluctuations in the charge amount of the toner when the toner concentration in the developer 1 changes, Z in formula (1) is preferably greater than or equal to a value obtained by multiplying X by 11 (i.e., $X\times11$), more preferably greater than or equal to a value obtained by multiplying X by 12 (i.e., $X\times12$), further preferably greater than or equal to a value obtained by multiplying X by 15 (i.e., $X\times15$), further more preferably greater than or equal to a value obtained by multiplying X by 20 (i.e., $X\times20$), still more preferably greater than or equal to a value obtained by multiplying X by 30 (i.e., $X\times30$), still further preferably greater than or equal to a value obtained by multiplying X by 50 (i.e., $X\times50$), even more preferably greater than or equal to a value obtained by multiplying X by 80 (i.e., $X\times80$), and particularly preferably greater than or equal to a value obtained by multiplying X by 100 (i.e., $X\times100$). In order to form images with less fog, Z in formula (1) is preferably no greater than 44.0 by contrast, more preferably no greater than 43.0, further preferably no greater than 42.0, further more preferably no greater than 40.0, still more preferably no greater than 30.0, still further preferably no greater than 20.0, and particularly preferably no greater than 15.0.

No particular limitations are placed on a method for producing the barium titanate particles 23, and the method may be hydrothermal synthesis, for example. The barium titanate particles 23 produced by the hydrothermal synthesis have a small true specific gravity due to having voids thereinside. Furthermore, the barium titanate particles 23 produced by the hydrothermal synthesis have a sharp particle diameter distribution. For these reasons, the barium titanate particles 23 produced by the hydrothermal synthesis easily disperse uniformly in the coating resin, thereby easily obtaining a carrier having uniform charge imparting ability. Therefore, the barium titanate particles 23 are preferably made from a hydrothermal compound.

The hydrothermal synthesis includes a hydrothermal reaction process and a thermal treatment process, for example. In the hydrothermal reaction process, a water-soluble barium salt is added to a titanium oxide dispersion in which titanium oxide particles are dispersed, and the resultant dispersion is heated to cause a hydrothermal reaction. Thus, barium titanate hydrothermally synthesized particles are obtained. In the thermal treatment process, the barium titanate hydrothermally synthesized particles are heat treated to obtain the barium titanate particles 23. The heating temperature in the hydrothermal reaction process is preferably at least 80° C.

The heating treatment temperature in the thermal treatment process is preferably at least 650° C. and no greater than 850° C. The number average primary particle diameter of the barium titanate particles 23 can be adjusted by changing the heating temperature and the time for the hydrothermal reaction in the hydrothermal reaction process, for example. For example, the higher the heating temperature in the hydrothermal reaction process is, the larger the number average primary particle diameter of the barium titanate particles 23 is. Furthermore, the longer the time for the hydrothermal reaction is, the larger the number average primary particle diameter of the barium titanate particles 23 is.

(Carbon Black Particles)

When the carbon black particles 24, which is conducive, are contained in the coat layers 22, charge can smoothly move from the carrier particles 20 to the toner particles 10. As a result, the toner particles 10 can be charged to a charge amount within the desired range, thereby achieving formation of images with less fog. The carbon black particles 24 have a number average primary particle diameter of preferably at least 10 nm and no greater than 50 nm, and more preferably at least 30 nm and no greater than 40 nm. The carbon black particles 24 have a DBP oil absorption of at least 300 $cm^3$/100 g and no greater than 700 $cm^3$/100 g, and more preferably at least 400 $cm^3$/100 g and no greater than 600 $cm^3$/100 g. The carbon black particles 24 have a BET specific surface area of preferably at least 1000 $m^2$/g and no greater than 2000 $m^2$/g, and more preferably at least 1200 $m^2$/g and no greater than 1500 $m^2$/g. The amount of the carbon black particles 24 is preferably at least 1 part by mass and no greater than 10 parts by mass relative to 100 parts by mass of the coating resin 100.

Note that the carrier particles 20 may contain a known additive as necessary. Preferably, the carrier particles 20 have a volume median diameter of at least 25 μm and no greater than 100 μm. The carrier has been descried so far.

[Developer Production Method]

The following describes one example of a method for producing the developer 1 according to the present embodiment. The method for producing the developer 1 according to the present embodiment includes a toner formation process, a carrier formation process, and a process of mixing a toner and a carrier, for example.

<Toner Formation Process>

In the toner formation process, for example, the binder resin, the colorant, the charge control agent, and the releasing agent are mixed to obtain a mixture. The mixture is melt-kneaded to obtain a melt-kneaded product. The melt-knead product is pulverized to obtain a pulverized product. The pulverized product is classified to obtain the toner mother particles 11. The toner mother particles 11 and the external additive particles 12 (strontium titanate particles 13 and the optional external additive particles 14) are mixed using a mixer. Through mixing, the external additive particles 12 are attached to the surfaces of the toner mother particles 11. Thus, a toner containing the toner particles 10 is obtained. The external additive particles 12 are mixed preferably under a condition that the external additive particles 12 are not entirely buried in the toner mother particles 11. The external additive particles 12 are attached to the surfaces of the toner mother particles 11 by physical bond (physical force) rather than chemical bond.

<Carrier Formation Process>

In the carrier formation process, the coat layers 22 are formed on the surfaces of the carrier cores 21 to obtain a carrier containing the carrier particles 20. For example, a coating liquid containing the coating resin, the barium titanate particles 23, and the optional carbon black particles 24 is sprayed on the carrier cores 21 in a fluid layer. Next, the carrier cores 21 on which the coating liquid has been sprayed are heated at a first specific temperature (also referred to below as a specific drying temperature) to dry the coating liquid attached to the surfaces of the carrier cores 21, thereby obtaining a dried product. Next, the dried product is heated at a second specific temperature (also referred to below as a specific baking temperature) using an electric furnace to harden the coating resin contained in the coating liquid on the surfaces of the carrier cores 21. Thus, the coat layers 22 are formed on the surfaces of the carrier cores 21. Preferably, the specific drying temperature is at least 70° C. and no greater than 80° C. The specific baking temperature is preferably at least 200° C. and no greater than 300° C.

The coverage ratio with the coat layers 22 of the carrier cores 21 can be adjusted by changing the specific drying temperature and the amount of the coating liquid sprayed toward the carrier cores 21, for example. A higher specific drying temperature allows the coating liquid to dry before the coating liquid spreads over the entire surface of the carrier cores 21. Therefore, at a higher specific drying temperature, the coat layers 22 are formed locally on the surfaces of the carrier cores 21 rather than over the entire surface thereof. This tends to reduce the coverage ratio. Furthermore, the smaller the amount of the coating liquid sprayed to the carrier cores 21 is, the more the coverage ratio tends to reduce.

<Process of Mixing Toner and Carrier>

In the process of mixing a toner and a carrier, the toner and the carrier are mixed using a mixer to obtain the developer 1.

EXAMPLES

The following provides more specific description of the present invention through use of Examples. However, the present invention is not limited to the scope of Examples.

<Preparation of Coating Liquids for Carriers>

First, coating liquids (L1) to (L20) were prepared. The compositions of the coating liquids (L1) to (L20) are shown in Tables 1 and 2. The coating liquids (L1) to (L20) were used for formation of coat layers in carriers.

TABLE 1

| | Coating resin | | | | BT | | Carbon black | Toluene | Z (BT/ |
|---|---|---|---|---|---|---|---|---|---|
| Coating liquid | Product name | Solid concentration [wt %] | Solution amount [part] | Amount [part] | Diameter [nm] | Amount [part] | Amount [part] | Amount [part] | coating resin) [wt %] |
| L1 | KR-255 | 50 | 200.0 | 100.0 | 300 | 10.0 | 3.0 | 800.0 | 10.0 |
| L2 | KR-255 | 50 | 200.0 | 100.0 | 300 | 17.0 | 3.0 | 800.0 | 17.0 |

TABLE 1-continued

| | | Coating resin | | | | BT | Carbon black | Toluene | Z (BT/ |
|---|---|---|---|---|---|---|---|---|---|
| | | Solid | Solution | | | | | | coating |
| Coating liquid | Product name | concentration [wt %] | amount [part] | Amount [part] | Diameter [nm] | Amount [part] | Amount [part] | Amount [part] | resin) [wt %] |
| L3 | KR-255 | 50 | 200.0 | 100.0 | 300 | 6.0 | 3.0 | 800.0 | 6.0 |
| L4 | KR-255 | 50 | 200.0 | 100.0 | 300 | 3.5 | 3.0 | 800.0 | 3.5 |
| L5 | KR-255 | 50 | 200.0 | 100.0 | 300 | 43.0 | 3.0 | 800.0 | 43.0 |
| L6 | KR-255 | 50 | 200.0 | 100.0 | 300 | 9.0 | 3.0 | 800.0 | 9.0 |
| L7 | KR-301 | 40 | 250.0 | 100.0 | 300 | 10.0 | 3.0 | 750.0 | 10.0 |
| L8 | ES-1001N | 45 | 222.2 | 100.0 | 300 | 10.0 | 3.0 | 777.8 | 10.0 |
| L9 | KR-255 | 50 | 200.0 | 100.0 | 100 | 10.0 | 3.0 | 800.0 | 10.0 |
| L10 | KR-255 | 50 | 200.0 | 100.0 | 480 | 10.0 | 3.0 | 800.0 | 10.0 |

TABLE 2

| | | Coating resin | | | | Carbon black | | | Z (BT/ |
|---|---|---|---|---|---|---|---|---|---|
| Coating liquid | Product name | Solid concentration [wt %] | Solution amount [part] | Amount [part] | BT Diameter [nm] | Amount [part] | Product name [part] | Toluene Amount [part] | coating resin) [wt %] |
| L11 | KR-255 | 50 | 200.0 | 100.0 | 300 | 40.0 | 3.0 | 800.0 | 40.0 |
| L12 | KR-255 | 50 | 200.0 | 100.0 | 300 | 19.0 | 3.0 | 800.0 | 19.0 |
| L13 | KR-255 | 50 | 200.0 | 100.0 | 300 | 5.0 | 3.0 | 800.0 | 5.0 |
| L14 | KR-255 | 50 | 200.0 | 100.0 | 300 | 2.8 | 3.0 | 800.0 | 2.8 |
| L15 | KR-255 | 50 | 200.0 | 100.0 | 300 | 48.0 | 3.0 | 800.0 | 48.0 |
| L16 | KR-255 | 50 | 200.0 | 100.0 | 300 | 8.0 | 3.0 | 800.0 | 8.0 |
| L17 | KR-255 | 50 | 200.0 | 100.0 | 75 | 10.0 | 3.0 | 800.0 | 10.0 |
| L18 | KR-255 | 50 | 200.0 | 100.0 | 550 | 10.0 | 3.0 | 800.0 | 10.0 |
| L19 | KR-255 | 50 | 200.0 | 100.0 | 300 | 2.5 | 3.0 | 800.0 | 2.5 |
| L20 | KR-255 | 50 | 200.0 | 100.0 | 300 | 50.0 | 3.0 | 800.0 | 50.0 |

The terms in Tables 1 and 2 mean as follows.

wt %: % by mass

Part: part by mass

KR-255: silicone resin solution ("KR-255", product of Shin-Etsu Chemical Co., Ltd., solid content: methylphenyl silicone resin, solid concentration: 50% by mass)

KR-301: silicone resin solution ("KR-301", product of Shin-Etsu Chemical Co., Ltd., solid content: methylphenyl silicone resin, solid concentration: 40% by mass)

ES-1001N: silicone resin solution ("ES-1001N", product of Shin-Etsu Chemical Co., Ltd., solid content: epoxy resin modified silicone resin, solid concentration: 45% by mass)

Solid concentration: solid concentration (unit: % by mass) of silicone resin solution Solution amount: amount (unit: part by mass) of silicone resin solution "Amount" in column "Coating resin": amount of coating resin The amount of a coating resin is a solid content amount of the coating resin. The amount of the coating resin is calculated using a calculation formula "[amount (unit: part by mass) of coating resin]=[amount (unit: part by mass) of silicone resin solution]×[solid concentration (unit: % by mass) of silicone resin solution]/100". For example, the amount of the coating resin in the coating liquid (L1) is calculated to be 100.0 (=200.0×50/100) parts by mass.

BT: barium titanate

"Diameter" in column "BT": number average primary particle diameter (unit: nm) of barium titanate particles Z (BT/coating resin): BT/coating resin rate The BT/coating resin rate is calculated using a calculation formula "[BT/coating resin rate (unit:% by mass)]=100×[amount (unit: part by mass) of barium titanate particles]/[amount (unit: part by mass) of coating resin]". For example, the BT/coating resin rate of the coating liquid (L1) is calculated to be 10.0 (=100×10.0/100.0) parts by mass.

(Preparation of Coating Liquid (L1))

A coating liquid (L1) was obtained by mixing 200.0 parts by mass of a silicone resin solution (KR-255, solid content amount: 100.0 parts by mass), 10.0 parts by mass of barium titanate (product of KCM Corporation, number average primary particle diameter: 300 nm), 3.0 parts by mass of a carbon black ("KETJEN BLACK EC600 JD", product of LION SPECIALTY CHEMICALS CO., LTD., conductive carbon black, DBP oil absorption: 495 $cm^3$/100 g, BET specific surface area: 1270 $m^2$/g, number average primary particle diameter: 34.0 nm), and 800.0 parts by mass of toluene.

(Preparation of Coating Liquids (L2) to (L6), (L11) to (L16), (L19), and (L20))

Coating liquids (L2) to (L6), (L11) to (L16), (L19), and (L20) were prepared according to the same method as that for preparing the coating liquid (L1) in all aspects other than that the amount of the barium titanate was changed from 10.0 parts by mass to those shown in Tables 1 and 2.

(Preparation of Coating Liquid (L7))

A coating liquid (L7) was prepared according to the same method as that for preparing the coating liquid (L1) in all aspects other than that 200.0 parts by mass of the silicone resin solution (KR-255) was changed to 250.0 parts by mass of a silicone resin solution (KR-301) and the amount of the toluene was changed from 800.0 parts by mass to 750.0 parts by mass.

(Preparation of Coating Liquid (L8))

A coating liquid (L8) was prepared according to the same method as that for preparing the coating liquid (L1) in all aspects other than that 200.0 parts by mass of the silicone resin solution (KR-255) was changed to 222.2 parts by mass of a silicone resin solution (ES-1001N) and the amount of the toluene was changed from 800.0 parts by mass to 777.8 parts by mass.

(Preparation of Coating Liquids (L9), (L10), (L17), and (L18))

Coating liquids (L9), (L10), (L17), and (L18) were prepared according to the same method as that for preparing the coating liquid (L1) in all aspects other than that the barium titanate with a number average primary particle diameter of 300 nm was changed to barium titanates with number average primary particle diameters shown in Tables 1 and 2. Note that each of the barium titanates with number average primary particle diameters shown in Tables 1 and 2 was a product of KCM Corporation.

<Synthesis of Non-crystalline Polyester Resin (R-1)>

A non-crystalline polyester resin (R1) to be used as a binder resin of toner mother particles was synthesized by the following method. First, a reaction vessel equipped with a thermometer (thermocouple), a dewatering conduit, a nitrogen inlet tube, and a stirring device (stirring impeller) was set in an oil bath. The reaction vessel was charged with 1575 g of a bisphenol A propylene oxide adduct (BPA-PO), 163 g of a bisphenol A ethylene oxide adduct (BPA-EO), 377 g of fumaric acid, and 4 g of a catalyst (dibutyltin oxide). Subsequently, after a nitrogen atmosphere was created inside the reaction vessel, the internal temperature of the reaction vessel was raised to 220° C. using the oil bath under content stirring. The contents of the reaction vessel were polymerized for 8 hours under conditions of the nitrogen atmosphere and a temperature of 220° C. while by-product water was removed. Subsequently, after the internal pressure of the reaction vessel was reduced, the contents of the reaction solution were further polymerized for 1 hour under conditions of the reduced pressure atmosphere (pressure: 60 mmHg) and a temperature of 220° C. Subsequently, after the internal temperature of the reaction vessel was reduced to 210° C., 336 g of trimellitic anhydride was added into the reaction vessel. Thereafter, the contents of the reaction vessel were caused to react under conditions of the reduced pressure atmosphere (pressure: 60 mmHg) and a temperature of 210° C. The reaction time for the reaction was adjusted so that the non-crystalline polyester resin (R1) being a reaction product had the following physical properties. Thereafter, the reaction product was taken out of the reaction vessel and cooled to obtain a non-crystalline polyester resin (R1) with the following physical properties. Note that the resultant polyester resin (R1) was determined to be non-crystalline because no clear endothermic peak was observed on the endothermic curve plotted using a differential scanning calorimeter and no clear melting point was determined.

(Physical Properties of Non-Crystalline Polyester Resin (R-1))

Softening point (Tm): 100° C.
Glass transition point (Tg): 50° ° C.
Mass average molecular weight (Mw): 30,000
Acid value: 15 mgKOH/g
Hydroxyl value: 30 mgKOH/g <Toner Mother Particle Preparation>

Using an FM mixer ("FM-10B", product of Nippon Coke & Engineering Co., Ltd.), 100 parts by mass of a binder resin, 4 parts by mass of a colorant, 1 part by mass of a charge control agent, and 5 parts by mass of a releasing agent were mixed to obtain a mixture. The binder resin used was the non-crystalline polyester resin (R1) obtained in <Synthesis of Non-crystalline Polyester Resin (R1)> described above. The colorant used was a copper phthalocyanine blue pigment (C.I. Pigment Blue 15:3). The charge control agent used was a quaternary ammonium salt ("BONTRON (registered Japanese trademark) P-51", product of ORIENT CHEMICAL INDUSTRIES CO., LTD.). The releasing agent used was a carnauba wax ("SPECIAL CARNAUBA WAX No. 1", product of S. Kato & Co.). The resultant mixture was melt-kneaded using a twin screw extruder ("MODEL PCM-30", product of Ikegai Corp.) to obtain a melt-kneaded product. The melt-kneaded product was pulverized using a mechanical pulverizer ("TURBO MILL", product of FREUND-TURBO CORPORATION) to obtain a pulverized product. The pulverized product was classified using a classifying apparatus ("ELBOW-JET", product of Nittetsu Mining Co., Ltd.). Through the above, toner mother particles in a powder state with a volume median diameter of 6.8 μm were obtained.

<Toner Preparation>

Toners for developers (A-1) to (A-19) and (B-1) to (B-12) were prepared. The compositions of these toners are shown in Tables 3 and 4 described later. For the sake of simple explanation, even a toner with the same composition as that of the toner for a developer (A-1) is shown in Tables 3 and 4 as a toner for a developer with a different developer number.

(Preparation of Toner for Developer (A-1))

Using an FM mixer ("FM-10B", product of Nippon Coke & Engineering Co., Ltd.), 100.00 parts by mass of the toner mother particles obtained in <Toner Mother Particle Preparation> described above, 1.50 parts by mass of silica particles, and 0.50 parts by mass of strontium titanate particles (number average primary particle diameter: 80 nm) were mixed for 5 minutes under a condition of a rotational speed of 4,000 rpm. The silica particles used were "AEROSIL (registered Japanese trademark) REA90" (dry silica particles rendered positively chargeable through surface treatment, number average primary particle diameter 20 nm) produced by Nippon Aerosil Co., Ltd. The strontium titanate particles used were "SW-100" (number average primary particle diameter: 80 nm, non-doped strontium titanate) produced by Titan Kogyo, Ltd. The resultant mixture was sifted using a 200-mesh sieve (opening 75 μm) to obtain a toner for the developer (A-1).

(Preparation of Toners for Developers (A-2) to (A-19) and (B-1) to (B-12))

Toners for the developers (A-2) to (A-19) and (B-1) to (B-12) were prepared according to the same method as that for preparing the toner for the developer (A-1) in all aspects other than that the strontium titanate particles with number average primary particle diameters shown in Tables 3 and 4 were used in amounts shown in Tables 3 and 4. For example, in the preparation of the toner for the developer (A-2), 0.85 parts by mass of strontium titanate particles with a number average primary particle diameter of 80 nm were used as shown in the column titled "Developer (A-2)".

In the preparation of the toner for the developer (A-8), strontium titanate particles (number average primary particle diameter: 50 nm, non-doped strontium titanate) produced by Titan Kogyo, Ltd. were used as the strontium titanate particles. In the preparation of the toner for the developer (A-9), strontium titanate particles (number average primary particle diameter: 20 nm, non-doped strontium titanate) produced by Titan Kogyo, Ltd. were used as the strontium titanate particles.

<Carrier Preparation>

Carriers for the developers (A-1) to (A-19) and (B-1) to (B-12) were prepared. The compositions of these carriers are shown in Tables 3 and 4 described later. For the sake of simple explanation, even a carrier with the same composition as that of the carrier for the developer (A-1) is shown in Tables 3 and 4 as a carrier for a developer with a different developer number. Furthermore, to aid understanding, the values for Z and the number average primary particle diameters of the barium titanate particles shown in Tables 1 and 2 are also shown again in Tables 3 and 4.

(Preparation of Toner for Developer (A-1))

While 1000 g of carrier cores are allowed to flow, the coating liquid (L1) was sprayed toward the carrier cores using a fluidized bed coating apparatus ("FD-MP-01 D", product of Powrex Corporation). Thus, carrier cores coated with the coating liquid (L1) were obtained. The coating conditions included a supply air temperature of 75° C., a supply air flow rate of 0.3 $m^3$/min, and a rotor rotational speed of 400 rpm. The carrier cores used were manganese ferrite cores (product of DOWA IP CREATION CO., LTD., volume median diameter: 34.7 μm, saturation magnetization: 80 emu/g). The amount of the coating liquid (L1) to be loaded into the fluidized bed coating apparatus was adjusted so as to give a coat layer/core rate of 2.2% by mass (i.e., so as to give a mass of the coat layers of 22 g relative to 1000 g of the carrier cores). Specifically, 197.22 g of the coating liquid (L1) was used. The coating liquid (L1) in an amount of 197.22 g contained 38.49 g of the silicone resin solution (KR-255, solid content: 19.47 g), 1.95 g of the barium titanate (solid content: 1.95 g), 0.58 g of the carbon black (solid content: 0.58 g), and 155.75 g of toluene. The total of the solid contents of those contained in 197.22 g of the coating liquid (L1) was 22.00 g (=19.47+1.95+0.58). Next, the carrier cores coated with the coating liquid (L1) were heated at 250° C. for 2 hours using an oven. In the manner described above, the coat layers were formed on the surfaces of the carrier cores to obtain a carrier for the developer (A-1).

(Preparation of Carriers for Developers (A-2) to (A-19) and (B-1) to (B-12))

Carriers for the developers (A-2) to (A-19) and (B-1) to (B-12) were prepared according to the same method as that for preparing the carriers for the developer (A-1) in all aspects other than that barium titanates with volume median diameters and saturation magnetizations shown in Tables 3 and 4 were used, the coating liquids shown in Tables 3 and 4 were used, and the amounts of the coating liquids to be loaded into the fluidized bed coating apparatus were adjusted so as to give the coat layer/core rates shown in Tables 3 and 4.

For example, in the preparation of the carrier for the developer (A-2), the coating liquid (L2) was used as shown in the column tilted "Developer (A-2)". Furthermore, in the preparation of the carrier for the developer (A-2), the amount of the coating liquid (L2) to be loaded into the fluidized bed coating apparatus was adjusted so as to give a coat layer/core rate of 2.2% by mass (i.e., so as to give a mass of the coat layers of 22 g relative to 1000 g of the carrier core). Specifically, 186.97 g of the coating liquid (L2) was used. The coating liquid (L2) in an amount of 186.97 g contained 36.66 g of the silicone resin solution (KR-255, solid content: 18.33 g), 3.12 g of the barium titanate (solid content: 3.12 g), 0.55 g of the carbon black (solid content: 0.55 g), and 146.64 g of toluene. The total of the amounts of the solid contents contained in 186.97 g of the coating liquid (L2) was 22.00 g (=18.33+3.12+0.55).

Furthermore, in the preparation of the carrier for the developer (A-10), manganese ferrite cores (product of DOWA IP CREATION CO., LTD., volume median diameter: 20.3 μm, saturation magnetization: 67 emu/g) were used as the carrier cores. In the preparation of the carrier for the developer (A-11), manganese ferrite cores (product of DOWA IP CREATION CO., LTD., volume median diameter: 58.8 μm, saturation magnetization: 87 emu/g) were used as the carrier cores.

<Methods for Measuring Saturation Magnetization, Volume Median Diameter, and Number Average Primary Particle Diameter>

The saturation magnetization of each type of the carrier cores was measured under a condition of an external magnetic field of 3000 (unit: Oe) using a high-sensitivity vibrating sample magnetometer ("VSM-P7", product of Toei Industry Co., Ltd.).

The volume median diameter (i.e., median diameter) of each type of the carrier cores was measured using a laser diffraction/scattering type particle size distribution analyzer ("LA-950", product of HORIBA, Ltd.).

The number average primary particle diameters of each type of the strontium titanate particles and each type of the barium titanate particles were measured using a scanning electron microscope ("JSM-7600F", product of JEOL Ltd., field emission scanning electron microscope). In the number average primary particle diameter measurement, the equivalent circle diameters (Heywood diameters: diameters of circles having the same areas as projected areas of primary particles) of 100 primary particles were measured and a number average thereof was obtained.

<Evaluation of Fogging Inhibition>

First, each of the developers to be used for evaluation of fogging inhibition were prepared. In detail, 9 parts by mass of one of toners and 100 parts by mass of one of carriers were mixed for 30 minutes using a shaker mixer ("TURBULA (registered Japanese trademark) MIXER T2F", product of Willy A. Bachofen AG (WAB)) to obtain a developer with a toner concentration of 9% by mass. Note that the toners and the carriers used are shown in Tables 3 and 4 in the developer preparation. For example, the toner for the developer (A-1) and the carrier for the developer (A-1) each shown in the column titled "Developer (A-1)" in Table 3 were used in the preparation of the developer (A-1).

Next, evaluation of fogging inhibition was carried out in a normal-temperature and a normal-humidity environment (environment at a temperature of 25° C. and a relative humidity of 50%). The developer with a toner concentration of 9% by mass was loaded into a development device for cyan color of an evaluation apparatus ("TASKalfa 5052ci", product of KYOCERA Document Solutions Japan Inc.), and a toner for replenishment use was loaded into a toner container for cyan color thereof. Using the evaluation apparatus, an image I (image with a printing rate of 2%) was consecutively printed on 10,000 sheets of A4-size paper. Directly thereafter, an image II (image with a printing rate of 20%) was consecutively printed on 100 sheets of A4-size paper using the evaluation apparatus. The reflection density of a blank portion of the 100th sheet of the paper with the image II printed thereon was measured using a white photometer ("TC-6DS", product of Tokyo Denshoku Co., Ltd.). Thereafter, a fog density was calculated using a formula "(fog density)=(reflection density of blank area)−(reflection density of unprinted paper)". Fogging inhibition was evaluated according to the following criteria. The measured fog densities and evaluation results are shown in Tables 5 and 6.

(Evaluation of Criteria of Fogging Inhibition)

A (good): fog density of less than 0.010

B (poor): fog density of 0.010 or more

<Evaluation of Charge Stability Against Toner Concentration Change in Developer>

Evaluation of charge stability against toner concentration change in each of the developers was carried out in a normal-temperature and a normal-humidity environment (environment at a temperature of 25° C. and a relative humidity of 50%). A plastic bottle with a capacity of 20 mL was charged with 10.0 g of one of the carriers and 0.3 g of one of the toners. The contents of the plastic bottle were stirred for 30 minutes under a condition of a rotational speed of 96 rpm using a shaker mixer ("TURBULA (registered Japanese trademark) MIXER T2F", product of Willy A. Bachofen AG (WAB)). Directly after the stirring, the charge amount (unit: μC/g) of the toner contained in the developer in the plastic bottle was measured using a compact toner draw-off charge measurement system ("MODEL 212HS", product of TREK, INC.). The measured charge amount was taken to be a charge amount (also referred to below as "T/C 3% charge amount") of the toner when the toner concentration of the developer was 3% by mass.

The charge amount (also referred to below as "T/C 6% charge amount") of the toner when the toner concentration in the developer was 6% by mass was measured according to the same method as that for measuring the T/C 3% charge amount in all aspects other than that 10.0 g of the carrier and 0.6 g of the toner were charged into the plastic bottle. The charge amount (also referred to below as "T/C 9% charge amount") of the toner when the toner concentration in the developer was 9% by mass was measured according to the same method as that for measuring the T/C 3% charge amount in all aspects other than that 10.0 g of the carrier and 0.9 g of the toner were charged into the plastic bottle. Based on the measured charge amounts, a gradient was calculated using a calculation formula "(gradient)={[(T/C 3% charge amount)−(T/C 9% charge amount)]/6}/(T/C 6% charge amount)". Note that the gradient (amount of change in charge amount of the toner against toner concentration change in the developer) was compensated by being divided by the T/C 6% charge amount in the calculation formula because the gradient is affected according to the absolute value of the charge amount. The smaller the gradient is, the smaller fluctuations in the charge amount of the toner is even when the toner concentration in the developer changes. Charge stability against toner concentration change in each of the developers was evaluated according to the following criteria. The calculated gradient and evaluation results are shown in Tables 5 and 6.

(Evaluation Criteria of Charge Stability Against Toner Concentration in Developer)

A (good): gradient of less than 0.090

B (poor): gradient of 0.090 or more

The terms in Tables 3 and 4 mean as follows.

wt %: % by mass

Part: parts by mass

Mother particles: toner mother particles

ST: strontium titanate

"Diameter" in column "ST": number average primary particle diameter (unit: nm) of strontium titanate particles BT: barium titanate "Diameter" in column "BT": number average primary particle diameter (unit: nm) of barium titanate particles Cores: carrier cores "Diameter" in column "Cores": volume median diameter (unit: μm) of carrier cores X (ST/mother particle): ST/mother particle rate The ST/mother particle rate is calculated using a calculation formula "[ST/mother particle rate (unit: % by mass)] =100×[amount (unit: part by mass) of strontium titanate particles]/[amount (unit: part by mass) of toner mother particles]". For example, the ST/mother particle rate of the toner for the developer (A-1) was calculated to be 0.50 (=100×0.50/100.0) % by mass.

X×10: value obtained by multiplying ST/mother particle rate by 10

Coat layer/core: coat layer/core rate The coat layer/core rate is calculated using a calculation formula "[coat layer/core rate (unit: % by mass)]=100×[mass (unit: parts by mass) of coat layers]/[mass (unit: part by mass) of carrier cores]=100×[mass (unit: part by mass) of solid content of coating liquid]/[mass (unit: part by mass) of carrier cores] =100×{[solid content (unit: part by mass) of silicone resin solution]+[mass (unit: part by mass) of barium titanate]+[mass (unit: part by mass) of carbon black]}/[mass (unit: part by mass) of carrier cores]". For example, the method for calculating a coat layer/core rate of the carrier for the developer (A-1) is as described above in (Preparation of Carrier for Development (A-1)).

Z (BT/coating resin): the same as defined for Z (BT/coating resin) in Tables 1 and 2

The terms in Tables 5 and 6 mean as follows.

FD: fog density

Charge amount (T/C=3%): T/C 3% charge amount (unit: μC/g)

Charge amount (T/C=6%): T/C 6% charge amount (unit: μC/g)

Charge amount (T/C=9%): T/C 9% charge amount (unit: μC/g)

TABLE 3

| | | Toner | | | | Carrier | | | | | | |
|---|---|---|---|---|---|---|---|---|---|---|---|---|
| | | Mother particles | ST | | X [wt %] (ST/mother particle) | Cores | | Coat layer | | | | Coat layer/core [wt %] |
| | Developer | Amount [part] | Amount [part] | Diameter [nm] | | Diameter [μm] | Saturation magnetization [emu/g] | Coating liquid | BT Diameter [nm] | Z [wt %] (BT/coating resin) | X × 10 | |
| Example 1 | A-1 | 100.00 | 0.50 | 80 | 0.50 | 34.7 | 80 | L1 | 300 | 10.0 | 5.0 | 2.2 |
| Example 2 | A-2 | 100.00 | 0.85 | 80 | 0.85 | 34.7 | 80 | L2 | 300 | 17.0 | 8.5 | 2.2 |
| Example 3 | A-3 | 100.00 | 0.30 | 80 | 0.30 | 34.7 | 80 | L3 | 300 | 6.0 | 3.0 | 2.2 |
| Example 4 | A-4 | 100.00 | 0.30 | 80 | 0.30 | 34.7 | 80 | L4 | 300 | 3.5 | 3.0 | 2.2 |

TABLE 3-continued

| | Developer | Toner: Mother particles Amount [part] | Toner: ST Amount [part] | Toner: ST Diameter [nm] | Toner: X [wt %] (ST/mother particle) | Carrier: Cores Diameter [µm] | Carrier: Cores Saturation magnetization [emu/g] | Carrier: Coat layer Coating liquid | Carrier: Coat layer BT Diameter [nm] | Carrier: Coat layer Z [wt %] (BT/coating resin) | X × 10 | Coat layer/core [wt %] |
|---|---|---|---|---|---|---|---|---|---|---|---|---|
| Example 5 | A-5 | 100.00 | 0.30 | 80 | 0.30 | 34.7 | 80 | L5 | 300 | 43.0 | 3.0 | 2.2 |
| Example 6 | A-6 | 100.00 | 0.85 | 80 | 0.85 | 34.7 | 80 | L6 | 300 | 9.0 | 8.5 | 2.2 |
| Example 7 | A-7 | 100.00 | 0.85 | 80 | 0.85 | 34.7 | 80 | L5 | 300 | 43.0 | 8.5 | 2.2 |
| Example 8 | A-8 | 100.00 | 0.50 | 50 | 0.50 | 34.7 | 80 | L1 | 300 | 10.0 | 5.0 | 2.2 |
| Example 9 | A-9 | 100.00 | 0.50 | 20 | 0.50 | 34.7 | 80 | L1 | 300 | 10.0 | 5.0 | 2.2 |
| Example 10 | A-10 | 100.00 | 0.50 | 80 | 0.50 | 20.3 | 67 | L1 | 300 | 10.0 | 5.0 | 2.2 |
| Example 11 | A-11 | 100.00 | 0.50 | 80 | 0.50 | 58.8 | 87 | L1 | 300 | 10.0 | 5.0 | 2.2 |
| Example 12 | A-12 | 100.00 | 0.50 | 80 | 0.50 | 34.7 | 80 | L7 | 300 | 10.0 | 5.0 | 2.2 |
| Example 13 | A-13 | 100.00 | 0.50 | 80 | 0.50 | 34.7 | 80 | L8 | 300 | 10.0 | 5.0 | 2.2 |
| Example 14 | A-14 | 100.00 | 0.50 | 80 | 0.50 | 34.7 | 80 | L9 | 100 | 10.0 | 5.0 | 2.2 |
| Example 15 | A-15 | 100.00 | 0.50 | 80 | 0.50 | 34.7 | 80 | L10 | 480 | 10.0 | 5.0 | 2.2 |
| Example 16 | A-16 | 100.00 | 0.50 | 80 | 0.50 | 34.7 | 80 | L1 | 300 | 10.0 | 5.0 | 2.0 |

TABLE 4

| | Developer | Toner: Mother particles Amount [part] | Toner: ST Amount [part] | Toner: ST Diameter [nm] | Toner: X [wt %] (ST/Mother particle) | Carrier: Cores Diameter [µm] | Carrier: Cores Saturation magnetization [emu/g] | Carrier: Coat layer Coating liquid | Carrier: Coat layer BT Diameter [nm] | Carrier: Coat layer Z [wt %] (BT/coating resin) | X × 10 | Coat layer/core [wt %] |
|---|---|---|---|---|---|---|---|---|---|---|---|---|
| Example 17 | A-17 | 100.00 | 0.50 | 80 | 0.50 | 34.7 | 80 | L1 | 300 | 10.0 | 5.0 | 4.0 |
| Example 18 | A-18 | 100.00 | 0.30 | 80 | 0.30 | 34.7 | 80 | L4 | 300 | 3.5 | 3.0 | 3.9 |
| Example 19 | A-19 | 100.00 | 0.50 | 80 | 0.50 | 34.7 | 80 | L11 | 300 | 40.0 | 5.0 | 2.2 |
| Comparative Example 1 | B-1 | 100.00 | 0.95 | 80 | 0.95 | 34.7 | 80 | L12 | 300 | 19.0 | 9.5 | 2.2 |
| Comparative Example 2 | B-2 | 100.00 | 0.25 | 80 | 0.25 | 34.7 | 80 | L13 | 300 | 5.0 | 2.5 | 2.2 |
| Comparative Example 3 | B-3 | 100.00 | 0.30 | 80 | 0.30 | 34.7 | 80 | L14 | 300 | 2.8 | 3.0 | 2.2 |
| Comparative Example 4 | B-4 | 100.00 | 0.30 | 80 | 0.30 | 34.7 | 80 | L15 | 300 | 48.0 | 3.0 | 2.2 |
| Comparative Example 5 | B-5 | 100.00 | 0.85 | 80 | 0.85 | 34.7 | 80 | L16 | 300 | 8.0 | 8.5 | 2.2 |
| Comparative Example 6 | B-6 | 100.00 | 0.85 | 80 | 0.85 | 34.7 | 80 | L15 | 300 | 48.0 | 8.5 | 2.2 |
| Comparative Example 7 | B-7 | 100.00 | 0.50 | 80 | 0.50 | 34.7 | 80 | L17 | 75 | 10.0 | 5.0 | 2.2 |
| Comparative Example 8 | B-8 | 100.00 | 0.50 | 80 | 0.50 | 34.7 | 80 | L18 | 550 | 10.0 | 5.0 | 2.2 |
| Comparative Example 9 | B-9 | 100.00 | 0.50 | 80 | 0.50 | 34.7 | 80 | L1 | 300 | 10.0 | 5.0 | 1.6 |
| Comparative Example 10 | B-10 | 100.00 | 0.50 | 80 | 0.50 | 34.7 | 80 | L1 | 300 | 10.0 | 5.0 | 4.4 |
| Comparative Example 11 | B-11 | 100.00 | 0.50 | 80 | 0.50 | 34.7 | 80 | L19 | 300 | 2.5 | 5.0 | 2.2 |
| Comparative Example 12 | B-12 | 100.00 | 0.50 | 80 | 0.50 | 34.7 | 80 | L20 | 300 | 50.0 | 5.0 | 2.2 |

TABLE 5

| | Developer | Fogging inhibition: FD | Fogging inhibition: Rating | Charge stability against toner concentration change: Charge amount (T/C = 3%) [µC/g] | Charge amount (T/C = 6%) [µC/g] | Charge amount (T/C = 9%) [µC/g] | Gradient | Rating |
|---|---|---|---|---|---|---|---|---|
| Example 1 | A-1 | 0.005 | A | 38.0 | 30.2 | 23.6 | 0.080 | A |
| Example 2 | A-2 | 0.008 | A | 44.3 | 35.2 | 27.5 | 0.080 | A |
| Example 3 | A-3 | 0.007 | A | 34.4 | 27.3 | 21.3 | 0.080 | A |

TABLE 5-continued

| | Developer | Fogging inhibition FD | Fogging inhibition Rating | Charge stability against toner concentration change: Charge amount (T/C = 3%) [μC/g] | Charge amount (T/C = 6%) [μC/g] | Charge amount (T/C = 9%) [μC/g] | Gradient | Rating |
|---|---|---|---|---|---|---|---|---|
| Example 4 | A-4 | 0.007 | A | 33.6 | 26.1 | 19.7 | 0.089 | A |
| Example 5 | A-5 | 0.009 | A | 39.5 | 31.5 | 24.7 | 0.078 | A |
| Example 6 | A-6 | 0.008 | A | 42.7 | 33.7 | 26.1 | 0.082 | A |
| Example 7 | A-7 | 0.009 | A | 43.7 | 34.8 | 27.2 | 0.079 | A |
| Example 8 | A-8 | 0.005 | A | 38.9 | 30.7 | 23.7 | 0.082 | A |
| Example 9 | A-9 | 0.004 | A | 40.0 | 31.4 | 24.1 | 0.084 | A |
| Example 10 | A-10 | 0.004 | A | 45.9 | 36.8 | 29.1 | 0.076 | A |
| Example 11 | A-11 | 0.005 | A | 33.9 | 26.5 | 20.2 | 0.086 | A |
| Example 12 | A-12 | 0.005 | A | 42.0 | 33.4 | 26.1 | 0.079 | A |
| Example 13 | A-13 | 0.007 | A | 36.2 | 28.6 | 22.1 | 0.082 | A |
| Example 14 | A-14 | 0.004 | A | 39.7 | 31.1 | 23.8 | 0.085 | A |
| Example 15 | A-15 | 0.007 | A | 36.1 | 28.6 | 22.2 | 0.081 | A |
| Example 16 | A-16 | 0.005 | A | 40.9 | 32.7 | 25.7 | 0.077 | A |

TABLE 6

| | Developer | Fogging inhibition FD | Fogging inhibition Rating | Charge stability against toner concentration change: Charge amount (T/C = 3%) [μC/g] | Charge amount (T/C = 6%) [μC/g] | Charge amount (T/C = 9%) [μC/g] | Gradient | Rating |
|---|---|---|---|---|---|---|---|---|
| Example 17 | A-17 | 0.004 | A | 34.4 | 26.8 | 20.3 | 0.087 | A |
| Example 18 | A-18 | 0.004 | A | 34.7 | 26.9 | 20.3 | 0.089 | A |
| Example 19 | A-19 | 0.008 | A | 41.4 | 33.0 | 25.9 | 0.078 | A |
| Comparative Example 1 | B-1 | 0.010 | B | 41.1 | 32.6 | 25.4 | 0.080 | A |
| Comparative Example 2 | B-2 | 0.011 | B | 34.0 | 27.0 | 21.1 | 0.080 | A |
| Comparative Example 3 | B-3 | 0.007 | A | 35.5 | 27.5 | 20.7 | 0.090 | B |
| Comparative Example 4 | B-4 | 0.013 | B | 40.0 | 32.0 | 25.2 | 0.077 | A |
| Comparative Example 5 | B-5 | 0.007 | A | 42.9 | 33.2 | 25.0 | 0.090 | B |
| Comparative Example 6 | B-6 | 0.014 | B | 43.8 | 34.9 | 27.3 | 0.079 | A |
| Comparative Example 7 | B-7 | 0.005 | A | 41.8 | 32.2 | 24.0 | 0.092 | B |
| Comparative Example 8 | B-8 | 0.012 | B | 34.6 | 27.5 | 21.5 | 0.080 | A |
| Comparative Example 9 | B-9 | 0.012 | B | 31.5 | 25.3 | 20.0 | 0.076 | A |
| Comparative Example 10 | B-10 | 0.015 | B | 32.2 | 24.9 | 18.7 | 0.090 | B |
| Comparative Example 11 | B-11 | 0.004 | A | 38.1 | 29.3 | 21.8 | 0.093 | B |
| Comparative Example 12 | B-12 | 0.013 | B | 42.2 | 33.6 | 26.3 | 0.079 | A |

As shown in Table 4, the ST/mother particle rate in the developer (B-1) exceeded 0.90% by mass. The ST/mother particle rate in the developer (B-2) was less than 0.30% by mass. The developers (B-4), (B-6), and (B-12) did not satisfy Z≤45.0 in formula (1). In the developer (B-8), the number average primary particle diameter of the barium titanate particles exceeded 500 nm. The coat layer/core rate in the developer (B-9) was less than 2.0% by mass. As a result, the developers (B-1), (B-2), (B-4), (B-6), (B-8), (B-9), and (B-12) were rated as poor in evaluation of fogging inhibition as shown in Table 6.

As shown in Table 4, the developers (B-3), (B-5), and (B-11) did not satisfy (X×10)≤Z in formula (1). In the developer (B-7), the number average primary particle diameter of the barium titanate particles was less than 100 nm. As a result, the developers (B-3), (B-5), (B-7), and (B-11) were each rated as poor in evaluation of charge stability against toner concentration change in a corresponding one of the developers as shown in Table 6.

As shown in Table 4, the coat layer/core rate in the developer (B-10) exceeded 4.0% by mass. As a result, the developer (B-10) was rated as poor in both evaluation of fogging inhibition and evaluation of charge stability against toner concentration change in the developer as shown in Table 6.

As shown in Tables 3 and 4, each of the developers (A-1) to (A-19) had the following features. That is, the ST/mother particle rate was at least 0.30% by mass and no greater than 0.90% by mass. The coat layers of the carrier particles contained barium titanate particles, and the coating resin included a silicone resin. The barium titanate particles had a number average primary particle diameter of at least 100 nm and no greater than 500 nm. The coat layer/core rate was at least 2.0% by mass and no greater than 4.0% by mass. The BT/coating resin rate satisfied formula (1). As a result, the developers (A-1) to (A-19) were each rated as good in both evaluation of hogging inhibition and evaluation of charge stability against toner concentration change in a corresponding one of the developers.

From the above, it was demonstrated that the developer of the present invention, which encompasses the developers (A-1) to (A-19), can contribute to formation of images with less fog and cause less fluctuations in the charge amount of the toner even when the toner concentration in the developer changes.

INDUSTRIAL APPLICABILITY

The developer according to the present invention can be used for image formation for example in copiers, printers, and multifunction peripherals.

The invention claimed is:

1. A two-component developer comprising:

a toner containing toner particles; and a carrier containing carrier particles, wherein the toner particles each include a toner mother particle and external additive particles provided on a surface of the toner mother particle, the external additive particles include strontium titanate particles, a first percentage content is at least 0.30 and no greater than 0.90% by mass, the first percentage content being a percentage content of the strontium titanate particles to a mass of the toner mother particles, the carrier particles each include a carrier core and a coat layer covering a surface of the carrier core, the coat layers contain a coating resin and barium titanate particles, the coating resin includes a silicone resin, the barium titanate particles have a number average primary particle diameter of at least 100 nm and no greater than 500 nm, a second percentage content is at least 2.0% by mass and no greater than 4.0% by mass, the second percentage content being a percentage content of the coat layers to a mass of the carrier cores, and a third percentage content satisfies a formula (1), the third percentage content being a percentage content of the barium titanate particles to a mass of the coating resin:

$$(X \times 10) \leq Z \leq 45.0 \tag{1}$$

where in the formula (1), X represents the first percentage content and Z represents the third percentage content.

2. The two-component developer according to claim 1, wherein the carrier cores have a volume median diameter of at least 20.0 μm and no greater than 60.0 μm.

3. The two-component developer according to claim 1, wherein the coat layers further contain carbon black particles.

4. The two-component developer according to claim 1, wherein the strontium titanate particles of the toner particles have a number average primary particle diameter of at least 20 nm and no greater than 80 nm.

5. The two-component developer according to claim 1, wherein the strontium titanate particles of the toner particles are non-doped strontium titanate particles.

* * * * *